Figure 1:
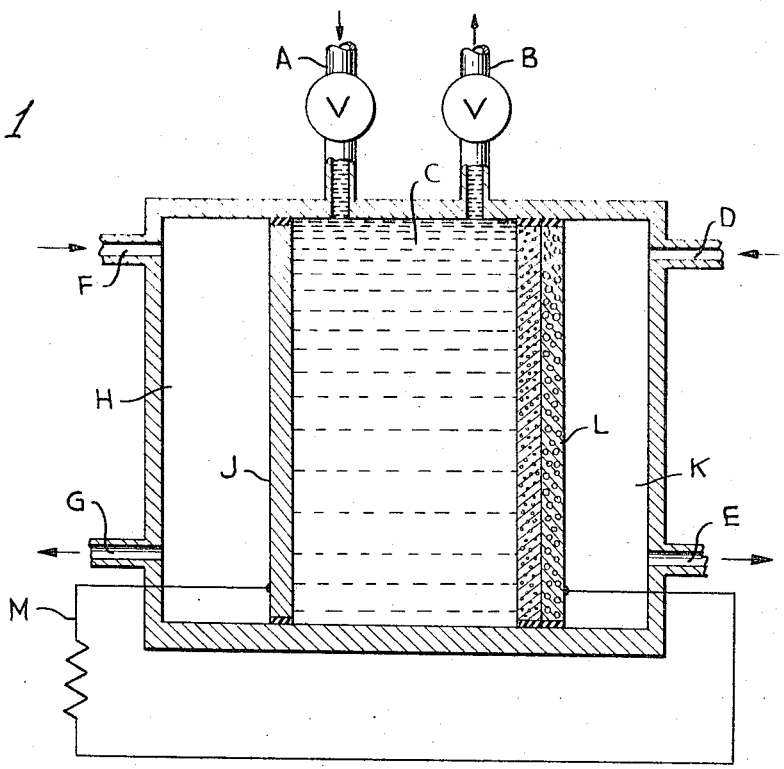

Dec. 13, 1966 H. G. OSWIN ETAL 3,291,643
FUEL CELL ELECTRODES
Filed April 27, 1962

INVENTORS
HARRY G. OSWIN
STEWART M. Chodosk
AND
Nigel I. PALMER
BY Watson, Cole, Grindle & Watson
ATTORNEYS United States Patent Office
3,291,643
Patented Dec. 13, 1966

3,291,643
FUEL CELL ELECTRODES
Harry G. Oswin, Ardsley, N.Y., Stewart M. Chodosh, River Edge, N.J., and Nigel I. Palmer, New York, N.Y., assignors to Leesona Corporation, Cranston, R.I., a corporation of Massachusetts
Filed Apr. 27, 1962, Ser. No. 190,695
10 Claims. (Cl. 136—86)

This invention relates to improved fuel cell electrodes and to fuel cells employing said electrodes. More particularly, the invention relates to non-porous palladium-silver alloy hydrogen diffusion electrodes which are activated with a thin film of "black."

In the production of electricity directly from a fuel and oxidant, the basic problem encountered in obtaining an efficient system is essentially one of chemical kinetics. It is necessary to carry out the reaction of fuel and oxidant so that the portion of energy degraded into heat is as small as possible. At the same time, the reaction rates must be high enough to economically provide sufficient current output from a practical sized cell. The basic problem is rendered more critical since it is necessary that the components of the cell be highly resistant to corrosion and remain substantially invariant under the operating conditions of the cell.

Thus, although fuel cells were known at least as early as the 19th century when Davy and Grove attempted to carry out the electrochemical oxidation of fuels, it was not until recently that research on fuel cells received renewed vigor. The desire to obtain a high power output per unit weight was a principal factor in influencing efforts to make a commercially feasible fuel cell. Recent developments have now made it apparent that fuel cells are commercially feasible and are capable of far surpassing the efficiency of a heat engine. However, in spite of the modern developments in fuel cell technology, the known cells are not completely practical from a commercial standpoint and research is going forward in an effort to obtain improved electrodes, fuels, and electrolytes as well as improvements in the overall design of the fuel cell.

In regard to the electrode, the research has been largely in the direction of a structure which (1) will permit more accurate control of the reaction interface, (2) has high activity with commercially available fuels and (3) is relatively light in construction. In the early fuel cells, the electrodes were substantially homo-porous. Therefore, to regulate the three phase interface of solid, gas and electrolyte, it was necessary to control the pore size of the electrode, pressure differential of the gas and surface tension of the electrolyte. As a practical matter, however, it was impossible to obtain pores completely uniform in size, thus, the cell was always operated with the smaller pores of the electrodes flooded with electrolyte due to capillary action or with gas bubbling through the larger pores unused. To a substantial extent, the advent of bi-porous electrode structures as proposed by Francis T. Bacon minimized the problem of controlling the reaction interface, since in a bi-porous system, the large pores face the gas supply and the smaller pores face the electrolyte. The three phase interface occurs substantially at the bi-porous wall.

Bi-porous electrodes, however, still possessed a number of disadvantages. It is necessary to construct bi-porous structures from metal powders having carefully controlled and well defined grain size employing a process having a number of individual operations such as sintering, compacting, etc., thereby resulting in a very expensive electrode. In addition, in a hydrogen-oxygen system, the oxidation of hydrogen at the three phase interface results in the formation of water within the pore structure, presenting a serious removal problem. Again, the prior art electrodes required the use of substantially pure hydrogen, since impurities in the gas will cause blocking of the pores, preventing diffusion of hydrogen to the reaction interface.

The introduction of electrodes constructed from non-porous palladium-silver alloy membranes was met with a high degree of enthusiasm. Such electrodes are light in weight, permit the diffusion of hydrogen, but prevent the passage of inert gaseous impurities into the electrolyte and allow water formation only on the electrolyte side of the membrane. These cells, therefore, have solved to a substantial extent, the problems encountered with both homo-porous and bi-porous electrode structures. However, at the preferred operating temperatures, the electrodes are relatively inactive or easily become polarized. Therefore, in order for such hydrogen diffusion electrodes to be completely feasible from a commercial standpoint, it is necessary that the palladium-silver alloy membrane be activated in order that a fuel cell employing such an anode will provide a sufficient electrical output at lower operating temperatures.

Accordingly, it is an object of the present invention to provide an activated non-porous hydrogen diffusion palladium-silver alloy electrode, which will be reactive at practical operating temperatures.

It is another object of the invention to provide an activated hydrogen diffusion electrode capable of utilizing impure hydrogen.

It is another object of the invention to provide an activated hydrogen diffusion electrode in which it is not essential to accurately control the pressure of the hydrogen fuel.

It is another object of the invention to provide a fuel cell electrode which will sustain high current densities at relatively low operating temperatures.

These and other objects of the invention will become more apparent from the following detailed description with particular emphasis being placed on the illustrative examples.

According to the instant invention, a fuel cell electrode is constructed from a non-porous palladium-silver alloy membrane and thereafter coating the membrane with a thin film of "black." The plating "black" can be palladium, platinum, rhodium, a mixture of palladium and rhodium, platinum and rhodium or platinum and iridium. However, electrodes coated with palladium black provide substantially superior performance in a fuel cell, in comparison to other blacks, particularly when in contact with the fuel gas. Depending upon the type of electrolyte employed in the cell, platinum black may be advantageously selected to coat the surface facing the electrolyte. All of the resultant electrodes possess excellent electrochemical characteristics and are particularly useful in low temperature fuel cell systems. The performance characteristics of a given fuel cell system when employing the instant activated electrodes is surprisingly superior in comparison with prior art electrodes including unactivated non-porous hydrogen diffusion palladium-silver alloy electrodes.

A fuel cell employing electrodes constructed according to the instant invention is illustrated diagrammatically in the drawing. Thus, in FIGURE 1, electrode J is a non-porous hydrogen diffusion palladium-silver alloy electrode activated with a thin film of 'black," such as palladium black. Hydrogen is passed into fuel compartment H through inlet F and gaseous impurities are vented through outlet G. The oxidizing electrode L can be any conventional oxidizing electrode known in the prior art, for example, a bi-porous nickel-nickel oxide air electrode. Air is passed into the oxidizing compartment K through inlet B and vented through outlet E. Electrolyte C, for example, a 75% aqueous potassium hydroxide electrolye, is contained between electrodes J and L and serves as an ion transfer medium. If desired, the electrolyte can be circulated by suitable means through electrolyte inlet and outlet A and B. Electrical current is removed from the cell through external circuit M.

As is apparent from the drawing, hydrogen gas diffuses through the activated palladium-silver alloy membrane separating an electron from the hydrogen fuel and passing the proton into the electrolyte. The electron is drawn off and carried via external route M to the oxidizing electrode.

Since only hydrogen is diffused through the activated non-porous palladium-silver alloy membrane, impure hydrogen gas containing carbon dioxide, carbon monoxide, water, methane ammonia, etc. can be used as the fuel. Pure hydrogen will diffuse through the membrane, and the gaseous impurities are easily removed by suitable venting. The impurities being concentrated in the fuel compartment cannot contaminate the electrolyte. Thus, an electrode capable of using relatively impure hydrogen is an important feature of the instant invention. Additionally, since the reaction occurs substantially at the electrolyte face of the non-porous palladium-silver alloy membrane, the formation of water occurs only in the electrolyte. Therefore, no problem is encountered due to electrode flooding. Water can be removed from the electrolyte as necessary by circulation through a suitable evaporator unit.

Pure palladium membranes are operable for activating within a thin film of "black" and thereafter, employed in electrode fabrication according to the instant invention. However, it has been found that palladium-silver alloy membranes are surprisingly superior to pure palladium both in mechanical and electrochemical properties. Thus, palladium membranes have a tendency to become brittle after long periods of exposure to hydrogen under operating fuel cell conditions. Palladium-silver alloy membranes on the other hand do not demonstrate brittleness even after prolonged periods of exposure to hydrogen at high temperatures. Additionally, diffusion of hydrogen through an activated palladium-silver alloy electrode is superior, particularly at lower temperatures. Another important feature is the potential stability of an activated palladium-silver membrane fuel cell electrode in comparison with an activated palladium electrode in a fuel cell system.

Alloys contained from about 5-45% by weight of silver have demonstrated good results with an alloy composed of about 20-35% silver showing optimum fuel cell electrode properties. At times, it may be desirable to include minor amounts, that is, up to about 5% of an additional metal such as gold, tellurium, iridium and rhodium in the palladium-silver alloy.

The thickness of the non-porous palladium-silver alloy membranes for use as the electrodes depends to a large extent upon the pressure differential to be applied across the membrane and upon the rapidity of the diffusion desired. Diffusion of hydrogen gas through the activated membrane is proportional to the pressure differential across the electrode structure and the membranes thickness. The minimum thickness is immaterial as long as the membrance is structurally able to withstand the necessary pressure of the fuel cell. It may be desirable to use an extremely thin activated palladium-silver alloy membrane and support the membrane by external means. The preferred range of thickness is from approximately 0.5 to 30 mils. The membranes can be fabricated as flat supported sheets or in a tubular or corrugated construction. It may be that tubular construction is preferred since the effective surface area of the electrode will be increased. Additionally, a tubular construction is ideal for bi-polar or multipolar cells.

After the non-porous palladium-silver alloy membrane is fabricated, it is coated with a thin film of "black." The "black" can be palladium, platinum, palladium-rhodium or rhodium. However, as stated hereinbefore, palladium has outstanding electrochemical characteristics and is preferred. Additionally, palladium black has a greater tendency to ahere to the non-porous palladium-silver membrane. The "blacks" employed are obtainable by known prior art means. For example, by electrolytically depositing the metal from a solution, such as palladium from a $PdCl_2$ solution.

The coating of non-porous palladium-silver alloy membranes with the "black" is performed by a method known in the art, for example, by electro-deposition from an aqueous acid solution. Additionally, it has been found that surprisingly superior results are achieved, particularly in regard to film adherence, by pre-exposing the electrode structure to be plated to hydrogen before plating with palladium black. The exposure to hydrogen can be accomplished by passing hydrogen at a positive pressure into the membrane at a high temperature. Other techniques include cathodic treatment in dilute sulphuric acid or dilute potassium hydroxide. After exposure of the membrane to hydrogen, the membrane can be plated by simply immersing in a solution of the plating metal, for example, a 2% solution of $PdCl_2$. The hydrogen acts as a reducing agent effecting the deposition of the black.

The quantity of the black coating is not particularly critical. Improved fuel cell performance is noted with the deposition of from 0.5 to 50 milligrams of black per square centimeter of electrode surface with the usual amount being no more than about 1-15 milligrams of black per square centimeter of surface due to economic considerations. From a practical standpoint, any amount of black can be applied by the instant method, however, it may be necessary to subject the structure to be plated to re-cathodic treatment.

Depending upon the ultimate use of the activated non-porous palladium-silver alloy membrane, it may be desirable to coat one surface with one thickness of palladium and the second surface with a different thickness or the second surface can be coated with another black, such as platinum. The coating of the separate surfaces with different "blacks" or with different thicknesses of the same "black" can be accomplished by exposing the first surface to the plating solution while masking the second surface, and thereafter coating the second surface. Depending upon the techniques employed, modifications in the structures are obtainable.

Figure 2:
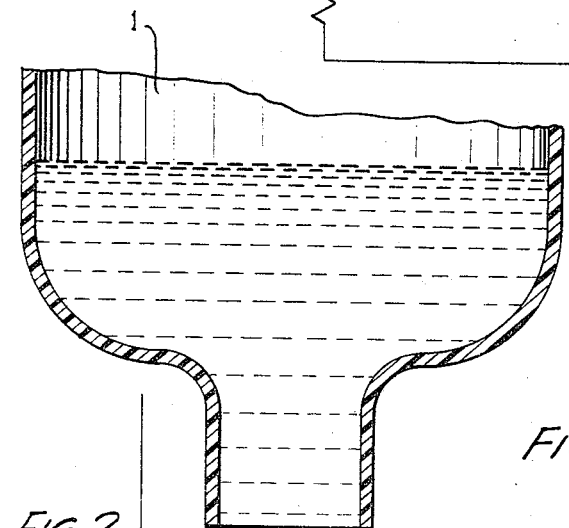
Figure 3:
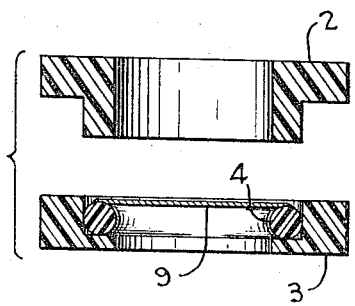

One preferred method of obtaining a different coating on the separate surfaces can be performed using the apparatus shown in FIGURES 2 and 3 of the drawing. Thus, FIGURE 2 is a diagrammatic illustration of a container and jig for accomplishing the coating and FIGURE 3 is an enlarged view of the jig which fits into the container.

More specifically, polyethylene container 1 is adapted to receive polyethylene cap 5. The male portion of the Teflon jig 2 is adapted to fit into the female portion of the jig 3. An O-ring 4, constructed from a suitable polymer, such as Vyton, fits into the female part of the jig. Electrode 9 is placed on the O-ring across the female portion of the jig. A silicone rubber gasket 7, is positioned across the polyethylene cap and a platinum mesh cathode 8 is brought in contact therewith. The plating solution is fed into the container and plating is carried out using a suitable electrical source, if one is needed. Other methods and apparatus for performing the operation can be advanced by those skilled in the art.

Additionally, it is apparent that it may not be desirable on all occasions to plate both sides of the non-porous palladium-silver alloy membrane with a suitable black. Thus, in a given system, it may be desirable to coat only the surface of the non-porous palladium-silver membrane which fronts the fuel or hydrogen gas side of the cell. The surface facing the electrolyte can be in an unactivated state. However, preferably, both surfaces are coated with a suitable "black" since electrode poisoning is more prevalent with an unactivated surface. The decision whether both surfaces should be plated is within the ability of one skilled in the art, depending upon the particular needs of a given fuel cell system.

The instant activated hydrogen diffusion electrodes are operable in fuel cell systems within a fairly wide temperature range. However, for good hydrogen diffusion, it is desirable that the temperature of the system be in excess of about 25° C. and preferably not over about 350° C. with the optimum temperature range being in the neighborhood of 100–300° C. The instant cells can be operated with a variety of electrolytes including aqueous alkalis such as potassium hydroxide, sodium hydroxide, potassium carbonate, and the alkanolamines. Acid electrolytes which may be employed include sulphuric and phosphoric acid. If an acid electrolyte is selected, it can be advantageous to coat the surface fronting the electrolyte with platinum black due to its exceptional resistance to attack by acids. An outstanding feature of the electrodes of the instant invention is that the formation of water occurs only in the electrolyte and not in the electrode structure. Thus, the water does not affect the hydrogen diffusion and can be conveniently removed from the electrolyte by suitable means. Thus, substantially any electrolyte can be employed as long as it is capable of transferring ions and remains substantially invariant in a given fuel cell system.

Having described the invention in general terms, the following examples are set forth to more particularly illustrate the invention. However, they are not to be construed as limiting. Other embodiments can be conveniently produced without departing from the scope of the instant invention.

*Example 1*

A palladium-silver alloy membrane 5 mils thick and having a diameter of 2¼ inches was cleaned by air abrading with finely powdered aluminum oxide. Thereafter, the membrane was suspended in a 5% aqueous potassium hydroxide bath. Platinum anodes were inserted in the potassium hydroxide bath on each side of the non-porous palladium-silver alloy membrane. Two anodes are employed to prevent curling of the electrodes being plated. Current is applied from a battery source. The electrode is kept in the aqueous potassium hydroxide bath for 5 minutes at which time a curtain of bubbles appears on the face of the electrode. The time of the treating is not important, it only being necessary to obtain a complete or substantially complete curtain of bubbles on the surface to be plated. The palladium-silver membrane is removed from the electrolyte bath and rinsed with distilled water. The membrane is then immersed in a 2% $PdCl_2$ bath. The membrane is kept in the bath for 6 minutes, depositing a film of palladium black on the membrane. Approximately 4 milligrams of palladium are deposited per centimeter of membrane surface. The electrode structure is washed with distilled water to remove excess $PdCl_2$ solution. Both sides of the membrane are coated. The operation is carried out at room temperature.

The resultant activated non-porous palladium-silver alloy membrane was compared with an identical structure which was unactivated. The comparisons were carried out at 200° C. employing 10 p.s.i.g. of hydrogen. The unactivated electrode at 82 millivolts polarization drew 22 ma./cm.$^2$ current whereas the activated electrode at 82 millivolts polarization drew 696 ma./cm.$^2$ current.

The activated palladium-silver alloy electrode structure was employed as the anode in a fuel cell system constructed substantially as that illustrated in FIGURE 1 of the drawing. The cathode L was a cobalt-nickel activated bi-porous nickel electrode, described more fully in the Lieb et. al. co-pending application, Serial No. 165,212, filed January 9, 1962, now abandoned, entitled "Fuel Cell Electrodes." The electrolyte C was a 75% aqueous potassium hydroxide solution. The operating temperature was 200° C. Impure hydrogen was fed into fuel compartment H through inlet F at 10 p.s.i.g. and vented through outlet G. Air was fed into inlet D and vented through outlet E. The cell at .945 volts, including 50 millivolts electrolyte IR drop, drew a current of 150 ma./cm.$^2$.

*Example 2*

A non-porous palladium-silver alloy membrane 1½ mils thick and having a diameter of 2¼ inches was plated with a palladium black film by the procedure set forth in Example 1. The reduction in $PDCl_2$ was carried out for three minutes depositing approximately 2 milligrams palladium per square centimeter of palladium-silver alloy structure. The resultant electrode was compared with an unactivated structure at 200° C. employing 10 p.s.i.g. of hydrogen. The unactivated electrode at 82 millivolts polarization provided a current of 37 ma./cm.$^2$, whereas the activated structure at 82 millivolts polarization provided a current of 1,044 ma./cm.$^2$.

*Example 3*

Employing the apparatus illustrated in FIGURES 2 and 3 of the drawing, a 1.5 mil thick non-porous palladium-silver alloy membrane having a diameter of 2¼ inches was coated on one surface depositing 11.4 milligrams palladium black per square centimeter and the second surface plated with 4.9 milligrams palladium black per square centimeter. The structure as a half cell with side 1 fronting the gas and side 2 fronting the electrolyte at 82 millivolts polarization provided 1,044 ma./cm.$^2$ current.

*Example 4*

Employing the apparatus illustrated in FIGURES 2 and 3 of the drawing, a 1.5 mil thick, non-porous palladium-silver alloy membrane 2¼ inches in diameter was coated on one surface depositing 6.3 milligrams of palladium black per square centimeter and the second surface plated with 7.0 milligrams of platinum black per square centimeter. The structure as a half cell, with the side coated with palladium black fronting the fuel gas and the side coated with platinum black facing the electrolyte, at 82 millivolts polarization provided 415 ma./cm.$^2$ current.

In Examples 1–4, the non-porous palladium-silver alloy membrane was composed of 25 parts silver and 75 parts palladium. However, the alloy can be replaced by other alloys containings from about 5–45 parts silver.

Additionally, in Examples 1–4, the palladium black can be replaced by platinum black, rhodium black, palladium-rhodium black, platinum-rhodium black and platinum-iridium black.

While various modifications of this invention are described, it should be appreciated that the invention should not be restricted thereto, but that other embodiments will be apparent to one skilled in the art which come within the scope and spirit of the invention and the appended claims.

What is claimed is:

1. A fuel cell for the generation of electrical current directly from a fuel and oxidant comprising a housing, a fuel electrode, an oxidant electrode, means for feeding fuel and oxidant to the respective electrodes, an electrolyte compartment defined between said electrodes containing an electrolyte, said fuel electrode being a hydrogen diffusion, non-porous palladium silver alloy membrane coated on at least the surface fronting the fuel gas with a thin film of metal black, said metal black being a Group VIII metal black according to the Mendelyeev's Periodic Table and said palladium-silver alloy containing from about 5 to 45 percent by weight silver.

2. The fuel cell of claim 1 wherein the palladium-silver alloy membrane is composed from about 75 percent palladium and 25 percent silver.

3. The fuel cell of claim 1 wherein the electrolyte is an aqueous alkaline electrolyte.

4. The fuel cell of claim 1 wherein the electrolyte is an aqueous acid electrolyte.

5. The fuel cell of claim 4 wherein the palladium silver alloy membrane is coated on the surface fronting the fuel gas with a thin film of palladium black and on the surface fronting the electrolyte with a thin film of platinum black.

6. The fuel cell of claim 1 wherein the metal black is palladium black.

7. The fuel cell of claim 6 wherein the electrolyte is an aqueous alkaline electrolyte.

8. The fuel cell of claim 6 wherein the electrolyte is an aqueous acid electrolyte.

9. The fuel cell of claim 6 wherein the cathode is bi-porous.

10. The fuel cell of claim 9 wherein the cathode is a cobalt-nickel activated nickel electrode.

References Cited by the Examiner

UNITED STATES PATENTS

| | | | |
|---|---|---|---|
| 2,384,463 | 9/1945 | Gunn et al. | 136—86 |
| 2,860,175 | 11/1958 | Justi | 136—86 |
| 2,901,523 | 8/1959 | Justi et al. | 136—86 |
| 2,947,797 | 8/1960 | Justi et al. | 136—86 |
| 3,020,327 | 2/1962 | Ruetschi | 136—120 |
| 3,092,517 | 6/1963 | Oswin | 136—120 |
| 3,113,049 | 12/1963 | Worsham | 136—86 |

WINSTON A. DOUGLAS, *Primary Examiner.*

JOHN R. SPECK, JOHN H. MACK, *Examiners.*

H. FEELEY, *Assistant Examiner.*